Patented Apr. 20, 1954

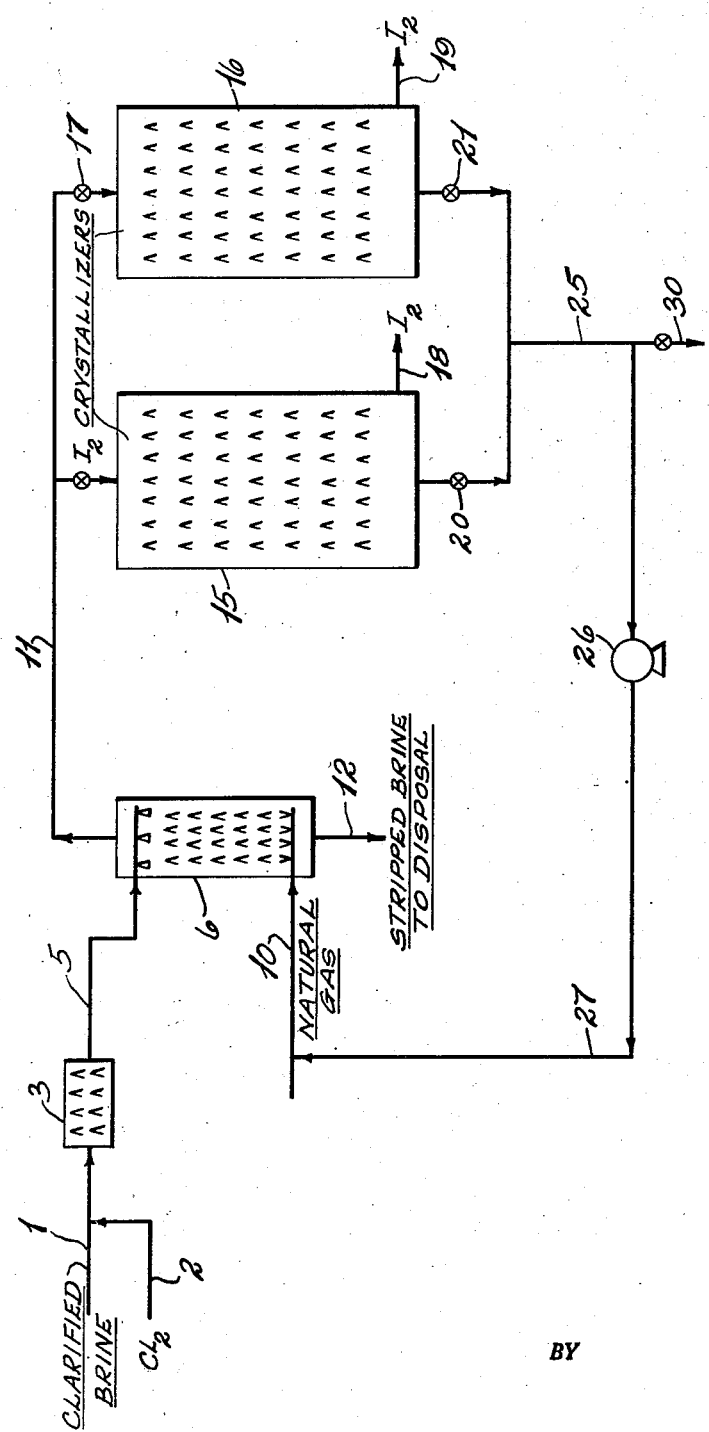

2,676,092

UNITED STATES PATENT OFFICE 2,676,092

PROCESS FOR RECOVERING IODINE FROM OIL WELL BRINE

Joseph C. Allen, Bellaire, Tex., assignor to The Texas Company, New York, N. Y., a corporation of Delaware Application March 30, 1953, Serial No. 345,576

7 Claims. (Cl. 23—216)

This invention relates to an improved process for recovering iodine from oil well brines. More particularly, it effects a significant improvement in the recovery of iodine from oil well brines by effecting volatilization of the iodine from the brine with high pressure natural gas rather than with air at atmospheric pressure.

There are in operation a number of commercial plants for recovering iodine from oil well brines. Approximately half of the total iodine needs of the United States are supplied in this manner. The process employed to recover iodine from oil well brines is described in detail in Industrial and Engineering Chemistry, volume 41, page 1547, 1949. In brief, the process involves three stages: brine clean-up; iodine removal from the brine by air blowing and recovery of the iodine from the air; iodine finishing. Brine clean-up involves separation of oil from the brine, removal of impurities by flocculation with ferric chloride and pH adjustment with sulfuric acid. The air blowing and recovery stage comprises oxidation of the brine with chlorine to liberate iodine from iodide and iodate salts, countercurrent air blowing of the oxidized brine, absorption of the blown-out iodine from the air by an aqueous solution of hydrogen iodide and sulfuric acid and reduction of the absorbed free iodine to hydrogen iodide by continuous addition of water and sulfur dioxide to the hydrogen iodide-sulfuric acid absorption liquor. The finishing operation involves oxidation of hydrogen iodide to iodine with chlorine; a portion of the hydrogen iodide-sulfuric acid liquor is continuously led off to contact with chlorine with the resulting precipitation of crystalline iodine. The process of this invention is directed to the intermediate stage and provides an improved method for removing the iodine from the brine. The process of the invention completely eliminates the finishing stage, and the absorption and reduction steps of the air blowing and recovery stage.

In accordance with the process of this invention, the cleaned iodine-containing brine is oxidized with chlorine and is blown with natural gas in a countercurrent scrubbing zone at a pressure between 3,000 and 4,500 p. s. i. g. and a temperature between 15 and 150° C. Blowing of the brine with natural gas at the prescribed pressure conditions effects volatilization of the iodine which is removed in vapor form in the high pressure natural gas. After removal from the scrubbing zone, the iodine-containing natural gas is reduced to a pressure in the range of 500 to 1,200 p. s. i. g. with the result that iodine separates from the gas in the form of a crystalline solid. The recovery of iodine from the natural gas by pressure reduction is sufficiently high that it is not necessary to employ an absorption process for recovering blown-out iodine from the natural gas. The natural gas containing a small concentration of iodine is repressured to about 3,000 to 4,500 p. s. i. g. and recycled to contact further quantities of brine.

Natural gas at pressures between 3,000 and 4,500 p. s. i. g. removes from the brine approximately 2 to 5 times as much iodine per cubic foot of gas as does air at atmospheric conditions. Natural gas at the specified pressures is a particularly preferred solvent for iodine and removes more than 90 per cent of the iodine present in the brine.

The main advantage of the process of this invention over the known process for recovering iodine from oil well brine is that the entire absorption and finishing operations required for isolating the iodine from the air are eliminated because more than 90 per cent of the iodine present in the high pressure gas separates as a crystalline solid on expansion of the gas to a pressure of 500 to 1,200 p. s. i. g.

The mechanisms by which high pressure natural gas effects removal of iodine from the brine by blowing and by which iodine crystallizes from the expanded natural gas are not completely understood. The volatilization of the iodine by countercurrent blowing with high pressure natural gas may be solely a partial pressure effect, but it is believed to be a retrograde vaporization phenomenon. In similar fashion, the high recovery of iodine from the natural gas on expansion to a pressure of about 900 p. s. i. g. is believed to be caused by a retrograde condensation phenomenon which, in this instance, would more properly be termed retrograde crystallization. It will be understood, however, that the process of the invention is completely distinct and independent from the theories proposed to explain its operation.

Contact of the high pressure natural gas with the oil well brine is normally effected at a temperature between 15 and 150° C. with pressures in the upper portion of the prescribed range, that is, between 95 and 150° C. being preferred because of the greater volatility of the iodine at the higher temperatures. The high pressures at which the iodine blow-out with natural gas is effected permit the use of temperatures well above the boiling point of water for the blow-out operation. This is a significant advantage in effecting the retrograde vaporization of iodine at the prescribed pressures.

Natural gas at pressures of 3,000 to 4,500 p. s. i. g. is available in many high pressure gas fields. Accordingly, it is advisable to locate a plant employing the process of this invention for iodine recovery near a high pressure gas field. A preferred pressure range for effecting iodine volatilization from brines is in the range of 3,500 to 4,000 p. s. i. g.

The high pressure natural gas is passed in countercurrent contact with the oil well brine at a rate of about 0.2 to 2.0 cubic feet of natural gas at standard conditions per cubic foot of brine. Contact of the brine with natural gas at the prescribed pressure and temperature conditions and at this gas velocity effects removal of better than 90 percent of the iodine present in the brine in a once-through operation. The contact is effected in a steel pressure tower lined with acid-proof brick and containing ceramic ring packing.

On removal from the contact zone, the natural gas contains approximately 14 grams of iodine per cubic foot of natural gas at standard conditions. On expansion of the iodine-containing gas to a pressure between 500 and 1,200 p. s. i. g., more than 90 per cent of the iodine present in the gas crystallizes. The preferred pressure range for expansion of the gas is between 800 and 1,100 p. s. i. g. Crystallization of the iodine is aided by the substantial temperature reduction accompanying the expansion of the natural gas from the neighborhood of 4,000 p. s. i. g. to about 1,000 p. s. i. g. The crystalline iodine obtained in the process of the invention has a purity of about 99.8 per cent and is sold as crude iodine.

The effluent natural gas obtained from the expansion zone which contains less than 0.5 gram of iodine per cubic foot is recompressed to a pressure in the range of 3,000 to 4,500 p. s. i. g. and is used to blow out further quantities of iodine from the brine.

In the accompanying drawing, there is diagrammatically illustrated the process of the invention. In the drawing, the brine clean-up operation involving separation of oil from the brine, removal of impurities by flocculation with a salt such as ferric chloride and pH adjustment with sulfuric acid are not illustrated since these operations do not constitute a part of the instant invention and are the same as those used in the commercial air blowing process for separating iodine from oil well brine.

Clarified brine is obtained from the brine clean-up stage through a pipe 1. Chlorine obtained through a pipe 2 is combined with the clarified brine in the pipe 1 and the chlorine-brine mixture is introduced into a contact zone 3 wherein the chlorine effects oxidation of iodine and iodate salts to molecular iodine.

The oxidized brine is then introduced through a pipe 5 into a blowing zone 6 wherein it is subjected to countercurrent contact with natural gas at a temperature of about 75° C., at a pressure of about 4,000 p. s. i. g. and at a rate of 1.0 cubic foot of gas per cubic foot of brine. Natural gas is introduced into the lower portion of the blowing zone 6 through a pipe 10. Countercurrent contact of the brine with natural gas at these conditions removes more than 95 per cent of the iodine present in the oil well brine in a single pass. The high pressure gas stream removed from the upper portion of the zone 6 through a pipe 11 contains the blown-out iodine.

The stripped brine is removed from the bottom of the blowing zone 6 through a pipe 12 and after passage through an expansion valve is emptied into a sewer, stream or other means of liquid disposal.

The high pressure iodine-containing gas stream obtained as an effluent from the contact zone 6 through the pipe 11 is introduced into an expansion zone 15 wherein it is reduced to a pressure of about 1,000 p. s. i. g. with the accompanying crystallization of more than 95 per cent of the iodine present in the gas stream. The iodine content of the gas stream is reduced from about 14.0 grams to about 0.5 gram per cubic foot by the expansion of the gas stream and the accompanying temperature drop. The iodine deposited in the expansion zone 15 which advantageously contains ceramic packing to prevent clogging has a purity of approximately 99.8 per cent.

When the crystallized iodine substantially fills the expansion zone 15, the effluent gas from the contact zone 6 is diverted into a second expansion zone 16 through a pipe 17. While the high iodine content natural gas is being expanded in the second expansion zone 16, the iodine is removed in molten form from the lower portion of the expansion zone 15 through a pipe 18. The expansion zones 15 and 16 are equipped with heating units, not shown, for melting the crystalline iodine prior to its removal. A pipe 19 serves as a means for withdrawing molten iodine from the second expansion unit 16.

The expanded gas stream is withdrawn from the expansion zone 15 or 16 through pipe 20 or 21, respectively, and is passed through a pipe 25 into a compressor 26 wherein it is recompressed to about 4,000 p. s. i. g. The repressured gas stream is then recycled to the contact zone 6 through pipes 27 and 10.

Vent 30 provides means for continuously or intermittently withdrawing a portion of the recycled gas stream in order to prevent build up of impurities in the high pressure gas stream.

It is apparent from the foregoing description that the process of the invention results in substantial economies and improvements in the recovery of iodine from oil well brine. The air blowing and recovery stage is substantially simplified by the elimination of the necessity of recovering iodine from the air by absorption with a hydrogen iodide-sulfuric acid solution and of the reduction of absorbed free iodine to hydrogen iodide by an aqueous sulfur dioxide solution. The finishing operation involving the liberation of the iodine fom hydrogen iodide by oxidation with chlorine is completely eliminated. The elimination of the afore-described operations in combination with the superior effectiveness of high pressure natural gas for removing iodine from brine as indicated by the fact that a cubic foot of natural gas removes approximately five times as much iodine as does a cubic foot of air at atmospheric conditions makes the process of this invention a significant advance in the recovery of iodine from oil well brine.

Although the process of the invention has been described as employing high pressure natural gas for blowing the brine to effect iodine removal, it will be understood that other individual hydrocarbon gases such as methane, ethane and propane can also be used in the process of the invention. Natural gas is generally used because of its ready availability at the pressure required in the process of the invention.

Obviously, many modifications and variations of the invention as hereinbefore set forth may be made without departing from the spirit and scope thereof, and, therefore, only such limitations should be imposed as are indicated in the appended claims.

I claim:

1. A process for recovering iodine from iodine-containing oil well brines which comprises blowing said brine in a contact zone with natural gas at a pressure between 3,000 and 4,500 p. s. i. g., removing from said contact zone an iodine-containing gas stream and expanding said gas stream to a pressure between 500 and 1,200 p. s. i. g. whereby iodine separates as a crystalline solid from said effluent gas.

2. A process for recovering iodine from iodine-containing oil well brines which comprises blowing said brine countercurrently with natural gas in a contact zone at a pressure between 3,000 and 4,500 p. s. i. g., removing from said contact zone an iodine-containing gas stream, expanding said gas stream to a pressure between 500 and 1,200 p. s. i. g. whereby iodine separates as a crystalline solid from said effluent gas, recompressing said gas stream to a pressure between 3,000 and 4,500 p. s. i. g. and recycling said recompressed gas stream to said contact zone.

3. A process according to claim 2 in which said brine is blown with natural gas at a temperature between 15 and 150° C.

4. A process according to claim 2 in which said brine is blown with natural gas at a pressure between 3,500 and 4,000 p. s. i. g.

5. A process according to claim 2 in which said iodine-containing gas stream is expanded to a pressure in the neighborhood of 800 to 1,100 p. s. i. g.

6. A process according to claim 2 in which said brine is blown with natural gas at a rate of 0.2 to 2.0 standard cubic feet of natural gas per cubic foot of brine.

7. A process according to claim 2 in which the iodine-containing brine has been subjected to a clean-up operation and oxidation with chlorine prior to its contact with high pressure natural gas.

No references cited.